United States Patent [19]

Hsu

[11] 4,419,236

[45] Dec. 6, 1983

[54] WATER DETECTING OR ABSORBING DEVICE FOR USE IN AND REMOVAL FROM A TANK WITH A LIMITED OPENING

[76] Inventor: Charles J. Hsu, P.O. Box 460 Grand Central Station, New York, N.Y. 10017

[21] Appl. No.: 357,070

[22] Filed: Mar. 11, 1982

[51] Int. Cl.³ .............................................. B01D 27/02

[52] U.S. Cl. ............................... 210/282; 33/126.7 R; 210/679; 210/689

[58] Field of Search .................... 33/126.7 R; 210/679, 210/689, 237, 238, 282, 416.4, 416.5, 502, 503, 484

[56] References Cited

U.S. PATENT DOCUMENTS

| | | | |
|---|---|---|---|
| 3,745,659 | 7/1973 | Hsu | 33/126.7 R |
| 3,951,812 | 4/1976 | Hsu | 210/282 |
| 4,045,387 | 8/1977 | Fanta et al. | 210/689 |

*Primary Examiner*—Ivars C. Cintins

*Attorney, Agent, or Firm*—Toren, McGeady and Stanger

[57] ABSTRACT

A device for detecting water in or for absorbing water from the bottom of a closed tank includes a closed envelope formed of a porous cover material. A filler material which absorbs water but not oil is placed into the envelope. A weighted member is inserted into the envelope along with the water absorbent material so that the envelope will sink to the bottom of the tank. The position of the envelope in the bottom of the tank depends on whether it is used for detecting or absorbing water. Usually these devices are used in closed tanks with openings of limited size. Once a device is used in the tank, it is important to be able to remove it through the tank opening. Preferably, the weighted member is a flat circular disc. The size and shape of the envelope and the amount of absorbent material used within it are such that when the material has completely absorbed as much water as it is capable of holding, the maximum size of the envelope does not exceed the maximum dimension of the weighted member. Accordingly, if the envelope including the weighted member can be inserted through an opening into a tank, it will be possible to remove the envelope out through the opening when it has absorbed as much water as possible.

16 Claims, 8 Drawing Figures

22 III 24 26 28 30 20 28 30 26 28 30 29 III

WATER DETECTING OR ABSORBING DEVICE FOR USE IN AND REMOVAL FROM A TANK WITH A LIMITED OPENING

SUMMARY OF THE INVENTION

The present invention is directed to a water absorbing or detecting device, and, more particularly, it is concerned with such a device incorporating a weighted member for holding the device on the bottom of a tank or in a vertical position with its lower end at the bottom of the tank.

It is well known that it is difficult to remove all of the water present in the bottom of an oil storage tank, especially when the tank is deep and the quantity of water is relatively shallow. Further, measuring the presence or the amount of water in the bottom of an oil tank or the like, especially a deep tank, entails certain problems.

In the applicant's U.S. Pat. No. 3,951,812 a water extractor is disclosed for removing water from the bottom of an oil tank. The device is an elongated envelope divided into separate compartments with weighted members in each compartment. In addition to the weighted members, the compartments contain a quantity of a water absorbent material which swells to many times its original dry size when it becomes fully saturated. The device is effective for removing water, however, it does present some problems in assuring that the envelope containing the water absorbent material rests on the bottom of the tank. In the past, when using elongated sinkers there has been a tendency for the envelope to rest partly on the bottom of the tank and partly against the side. Where the amount of water is quite shallow, it often happens that the water absorbent material does not have an opportunity to remove all of the water present.

Another U.S. Pat. No. 3,745,659 of the applicant discloses a water-in-oil detector. The device acts as a gauge to indicate the presence of water in the bottom of a storage tank and the depth of the water. The detector is made of an elongated enclosure divided into a number of compartments or pockets along its length. Each pocket defines one unit of linear dimension. When the device is placed in a tank, its lowest pocket is provided with a weight so that the device or enclosure will settle through the oil and just contact the bottom of the tank. Depending on the depth of the water in the tank, the number of pockets corresponding to the depth, absorb water and expand. Since the water absorbent material does not absorb oil the pockets above the water do not expand. This gauge device is tethered within the tank by a string so that it can be removed through the tank opening after a sufficient period has elapsed for checking the presence of water.

In practice, water extractors and water-in-oil detectors are constructed so that when they absorb as much water as they are capable of holding, the device will have a certain maximum size. The device bears a legend that it cannot be inserted through an opening smaller than a certain size, because its maximum dimension when it has completely absorbed as much water as possible, will not permit it to be removed through the opening. Unfortunately, the warning provided with the device is often disregarded and the device is inserted through an opening into a tank from which it cannot subsequently be removed when it fully absorbs as much water as it can hold.

The devices used for detecting water and oil and for removing water are supplied in a number of different sizes intended for use in a variety of tanks and tank openings. Each model is extensively tested based on its size and construction to determine the maximum diameter it will have when it is full of water. A customer can select a particular model adapted for a particular size tank opening based on the instructions provided with the device. Experience has shown, however, that the persons using the device often disregard the warning concerning size and use it in an opening through which it cannot be removed when it absorbs the maximum amount of water it can hold.

These devices containing the water absorbent material are reusable. After the device is removed from a tank it can be dried and reused a number of times. If the size of the device after it has been used is such that it cannot be removed through the tank opening, the only way it can be removed is that the envelope of the device must be cut displacing its content into the tank. Removal of the contents from the tank presents a difficult problem and could contaminate the oil or other liquid within the tank.

Therefore, it is the primary object of the present invention to incorporate a weighted member in the device and to size the envelope and select the amount of water absorbent material so that the device can only be inserted into certain sized tank openings and, when it is fully expanded it is assured that the device can be removed from the tank without any rupturing or breaking the envelope enclosing the device. If the maximum dimension of the weighted member is greater than the diameter of the tank opening, it cannot be inserted into the tank. The maximum dimension of the weighted members determines the minimum size opening through which it can be inserted.

In accordance with the present invention, the water absorbing or detecting device includes a closed envelope preferably divided into a number of individual compartments or pockets one following the other along the length of the envelope. Depending on the use of the device, one, certain of the compartments, or all of them contain a weighted member. The maximum size of the weighted member assures that it will pass through the opening into the tank. The maximum size of the weighted member assures that it can be inserted through any opening above a minimum diameter corresponding to the maximum diameter or dimension of the weighted member. Further, each compartment contains a water absorbent material which expands to many times its original size when it is exposed to liquid water. Preferably, the weighted members are substantially flat circular discs or substantially flat discs with a polygonal shape approaching that of a circular disc.

When such a device passes through the opening into an oil tank, the weighted member assures that at least the leading end of the envelope sinks to the bottom of the tank. Within the tank the arrangement of the weighted members in the device, because of their shape and the general configuration of the envelope, assures that the device lies flat on the bottom of the tank if it used to absorb the water or that it hangs vertically within the tank with its lower end touching the bottom if it is to be used as a water gauge. Accordingly, since the cover or envelope defining the outer surface of the device is formed of a porous material, any water in the bottom of the tank will pass into the individual compartments and be absorbed by the filler or absorbent material within these compartments. The size of the envelope and the amount of water absorbent material placed in each compartment along with the maximum dimension of the weighted member are such that when it is fully saturated, the maximum dimension of the device transverse of its long direction, or the direction in which it is removed from the tank, is such that the device can be removed through the tank opening.

The combination of the shape and weight of the weighted member assures that the device will adopt the desires position within the tank when in use. If the device is used to remove water from the tank, it will rest on the bottom of the tank and not become lodged partly on the bottom and partly extending upwardly along the side. If the device is used as a water gauge it will just reach to the bottom of the tank so that the depth of water in the tank can be measured. The proper position of the device is particularly significant when the amount of water in the tank forms a very shallow pool at the bottom, since the device must have direct contact with the water to afford its absorbence.

The use of water absorbent material capable of absorbing significant quantities of water is known from a number of the applicant's U.S. Patents, for instance, U.S. Pat. Nos. 3,280,549; 3,745,569 and 3,951,812. Preferably, the water absorbent material is one that reacts only to the presence of liquid water and not to other liquids, such as oil, which do not contain water. Either natural or synthetic substances can be used as the water absorbent material. The material is utilized in a form which assures the maximum amount of absorbency in the least period of time. Accordingly, material in a form providing a maximum contact surface for the liquid water assures the best effect.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
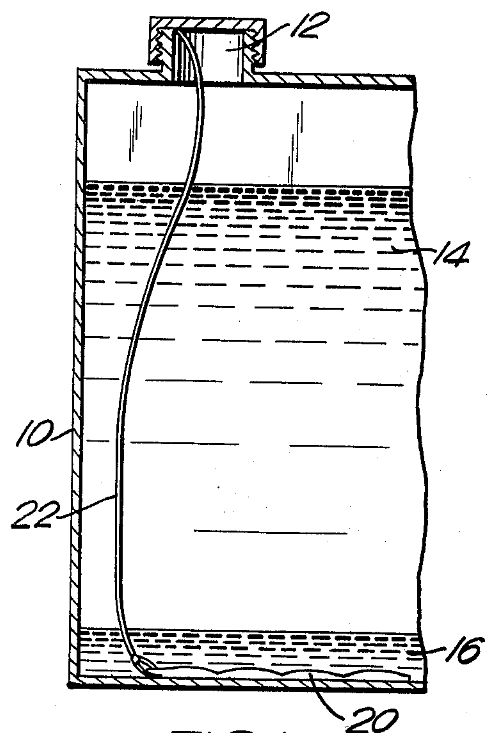
FIG. 1 is a partial sectional view of an oil tank illustrating the water-absorbing device of the present invention in position to remove water from the bottom of the tank.

In FIG. 1 an oil tank 10 is illustrated having an opening 12 in its upper end. The tank contains a body of oil 14, the type of oil is not significant. The tank contains a quantity of water 16 which settles on the bottom of the tank. Depending on circumstances, the amount of water 16 in the tank may vary from a thin layer to a significant depth. It is important to be able to remove the amount of water in the tank in a simple and rapid manner and also to be able to remove the water absorbing means from the tank 10 once it is fully saturated.

To remove the water, a water absorbing device 20 is placed into the tank through the opening 12. The device includes a line or cable 22 of sufficient length so that the device can rest on the bottom of the tank and the device can be removed once it is fully saturated or at least has removed all of the water from the tank bottom.

The water absorbing device 20 includes an elongated envelope or casing 24 formed of a porous material. The envelope can be formed in various ways. The envelope 24 is formed by folding a single piece of material over upon itself with the fold line extending in the long direction and stitching or otherwise closing the open edges of the folded material. While it is possible to utilize an envelope with a single compartment, such as in FIG. 8, it is preferable to use the arrangement shown in FIG. 2 where the envelope 24 is divided into individual pockets or compartments 26 by stitching or otherwise attaching the opposite layers of the envelope together along lines 28 extending transversely of the elongated direction of the envelope. The envelope 24 can be formed of a woven cotten fabric, however, other fabrics can also be used, such as porous synthetic fabrics or materials, paper, or metal foils perforated to permit the passage of water. The significant feature of the porous material envelope is that it permits an almost instantaneous flow of liquid water into the compartments in the envelope. The term "liquid water" is used because the filler or water absorbent material does not absorb water vapor or remove water moisture out of humid air.

A thin layer of a pulverized water absorbing material 29, which expands to many times its original dry size when it is contacted by liquid water, is inserted into compartment 26. One natural material used as the filler or water absorbent material 29 is sterculia lychnophora Hance derived from a plant which grows in the Orient. When this plant is dried and pulverized and then contacted by liquid water, it absorbs the water and expands to more than fifteen times its original dry size. Preferably, the water absorbency of the material is improved by using it to absorb water before it is placed in the envelope and drying the wet material. When this has been done, the water absorbing capability of the material is significantly increased.

There are synthetic materials presently available which have the same general characteristics of the sterculia lynchnophora Hance powder. These materials are super-absorbent and can be used in a vaiety of forms, such as powdered, chopped or in sheet or plate form.

Figure 5:
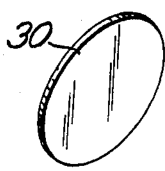
FIG. 5 is a perspective view of the weighted members shown in FIGS. 2–4.

It will be appreciated that the water-absorbent material 29 is placed in the envelope before it is closed and, in addition, a weighted member 30 is inserted into each compartment. As shown in FIG. 5, the weighted member 30, preferably formed of a metal though any other heavy substance could be used, is a flat circular disc. While the weighted member is flat, it could have a configuration which might be defined as approximately flat and still provide the desired effect. The weighted member 30 has a maximum dimension, that is, its diameter determines the size of the opening through which it can be inserted. It can be inserted through an opening with the same diameter as its maximum diameter. It can not be passed through an opening smaller than its maximum diameter. It should be understood that the device can be inserted through any opening which is larger than the maximum diameter of the weighted member. The problem which the present invention solves is that as long as the device fits through the tank opening even when it expands, due to the absorption of water, it will be possible to remove the device. If the device passes through the opening it will not become stuck or hung-up in the tank.

Figure 2:
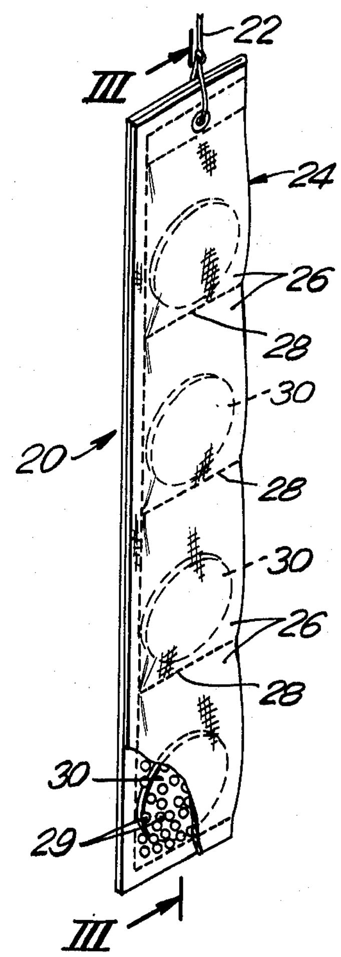
FIG. 2 is a perspective view of one embodiment of the present invention.
Figure 3:
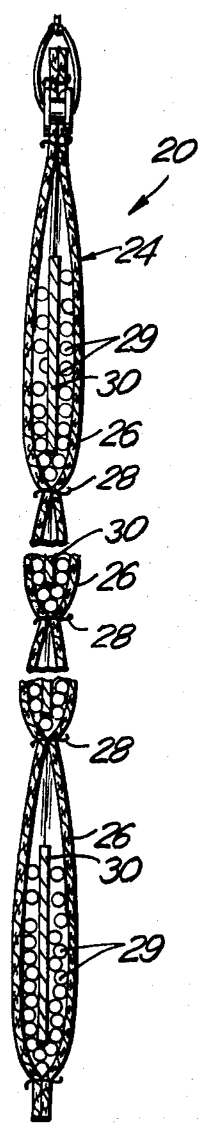
FIG. 3 is a sectional side view of the device shown in FIG. 2 taken along the line III—III.

The envelope 24 is dimensioned so that its flattened size in the dry state, as shown in FIG. 2, permits it to be passed through the opening 12 into the tank without interfering with the insertion. Further, a relatively thin layer of the water absorbent material 29 is used, so that an adequate amount of the material is present to remove any water which may be found in the bottom of the tank. The amount of material placed within the envelope 24 is significant for several reasons. To assure the optimum effect of water absorbency it is important that a relatively thin layer is used so that all of the material is exposed to water. If a thick layer of the material is placed within the envelope, passage of the liquid water into the inner part of the filler or water absorbent material is blocked by the material in contact with the cover forming the envelope. Furthermore, if too great an amount of water absorbent material is placed in the envelope, as compared to the available space within the envelope for expansion, the amount of expansion might be excessive so that removal of the device through the opening 12 would be prevented. Accordingly, a thin layer should be used based on the size of the individual compartments 26 and the expansion characteristic of the water absorbing material when it is contacted by liquid water.

The line 22 is attached to one end of the envelope for lowering the device into the tank and for removing it once it has become fully saturated or has removed all of the water from the bottom of the tank.

Figure 4:
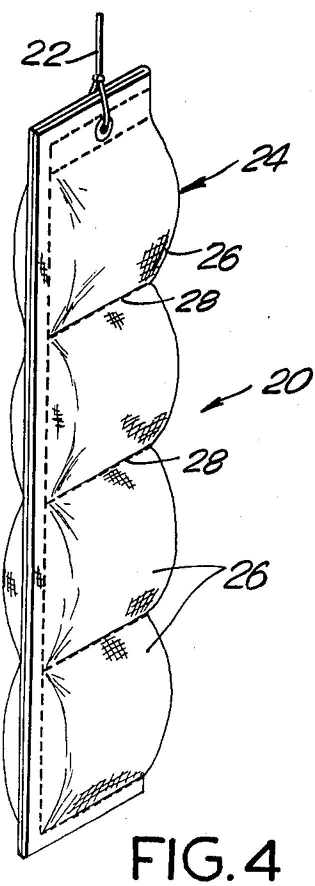
FIG. 4 is a perspective view of the device shown in FIG. 2 after it is fully saturated with water.

In FIG. 4, the water absorbing device 20 is shown when the water absorbent material 29 has become fully saturated with the maximum transverse cross-sectional dimension of the envelope substantially the same as the maximum dimension of the weighted member 30. If the transverse size of the expanded envelope is the same as that of the weighted members 30, the device can be withdrawn out of the tank 10 through the opening 12. If too much of the water absorbent materis is introduced into the envelope, when exposed to liquid water it might expand to an extent where the device can not be removed from the tank. The liquid water taken up by the water absorbent material 29 can not be squeezed out by trying to pull the device through an opening smaller than its maximum transverse dimension. The water absorbing device 20, after it has been used, can be dried and reused. During the drying operation, the envelope 24 returns to its original dry state as shown in FIG. 2. As mentioned, the absorbed water is removed by drying, it can not be squeezed out.

The elongated dimension of the envelope or casing 24 is selected, depending on the size of the tank, so that it can rest on the tank bottom and effectively remove water. The weighted members assure that the device sinks to the bottom of the tank and remains there. By using the flat circular disc-shape or a shape approximating it, the envelope can be held on the bottom of the tank and there is not the likelihood that the envelope might rest partly on the bottom and partly on the side of the tank, because of the shape of the weighted member which provides a significant feature of the present invention.

As illustrated, the envelope 24 in its dry state has a flat elongated rectangular appearance. Other shapes are possible, for instance, if a single compartment is provided within the envelope, the envelope could have a shape generally the same as the flat circular disc 30.

By using flat circular discs for the weighted members 30 and a thin layer of the water absorbent material 29, the envelope can be folded with one compartment superposed on the next so that a compact storage or shipping arrangement of the device is available.

Figure 6:
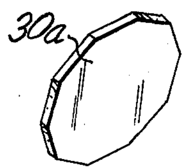
FIG. 6 is a perspective view of another embodiment of the weighted members.

As shown in FIG. 6, a weighted member **30*a*** can be used which is a flat polygonally shaped disc having a circumferential edge approximating a circular shape.

Figures 7, 8:
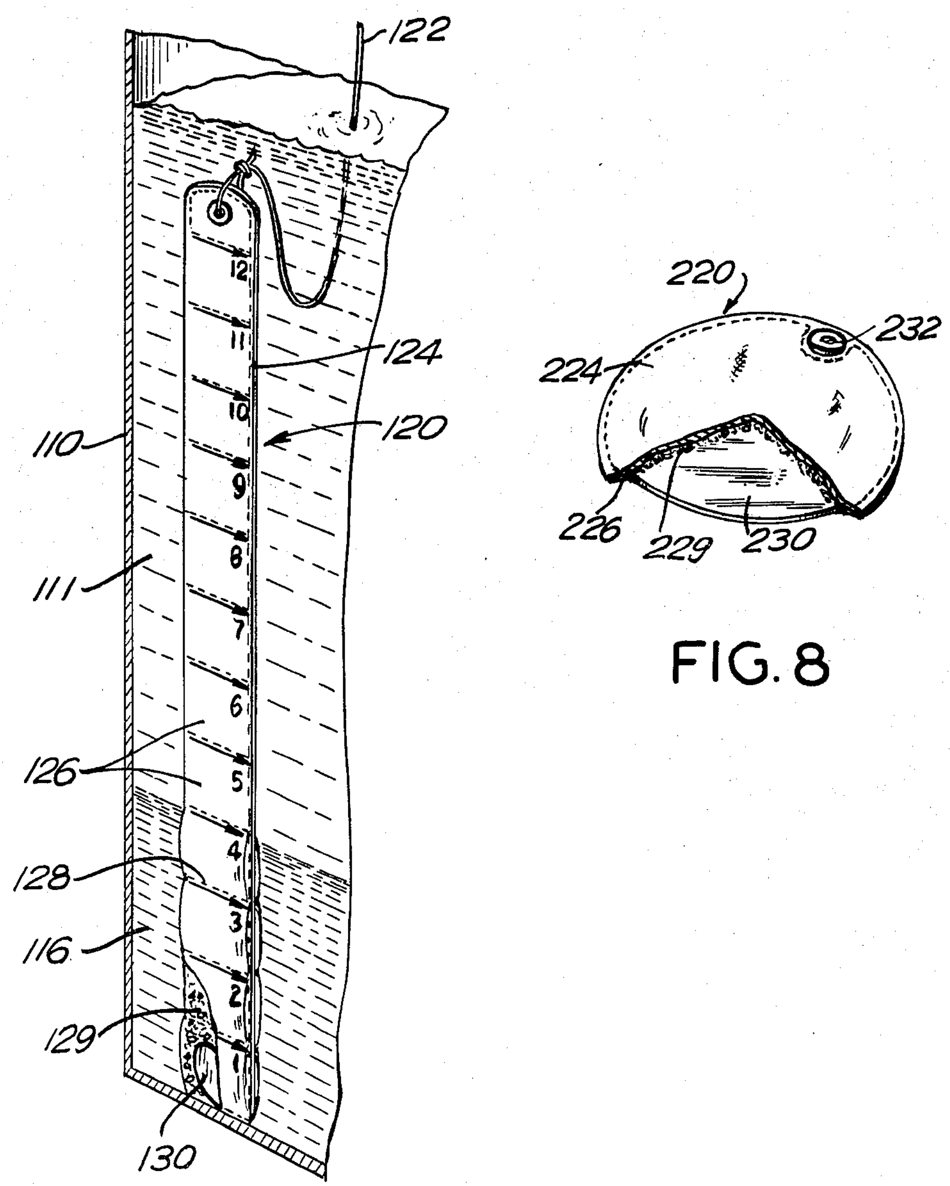
FIG. 7 is a partial sectional view of an oil tank illustrating a water detecting device embodying the present invention in position to gauge the depth of water in the bottom of the tank.
FIG. 8 is a perspective view of still another embodiment of the present invention where the device has a single compartment.

In FIG. 7 a water-detecting device or gauge 120 is shown within an oil tank 110. The tank contains a body of oil 114. In the tank, below the body of oil 114, is a quantity of water 116. It is the purpose of the device to note the presence of and to measure the depth of the water 116 in the bottom of the tank 110. The water detecting device 120 is similar in construction to the water absorbing device 20 shown in FIG. 2. The device 120 includes a line or cable 122 by which it can be dropped into the tank through an opening, not shown.

The water detecting device 120 includes an elongated envelope or casing 124 formed by folding a single piece of material over upon itself along a fold line extending in the long direction of the device. The open sides of the piece of material are stitched closed or some other attaching means can be used. The interior of the envelope 124 is divided into a number of individual pockets or compartments 126 by securing the opposite sides of the piece of material together along line 128 extending transversely of the long direction of the device.

Either or both of the broad faces of the envelope 124 are marked with numbers signifying the depth of the water. The scale used on the device can be varied in accordance with the depth of water to be measured. In some instances the depth may be considerable and in other cases it may be relatively shallow.

The envelope 124 can be formed of the same material used for the envelope 24 shown in FIG. 2.

Each compartment 126 contains a thin layer of a water absorbing material 129 which is capable of expanding to many times its original dry size when contacted by liquid water. The same water absorbent material is used in this device as in the device 20.

In addition to the water absorbent material 129 the lowermost pocket is provided with a weighted member 130. Preferably, the weighted member 130 is formed of a metal or other heavy substance and is in the shape of a flat circular disc or similar member.

The device 120 is weighted so that it just contacts the bottom of the tank. If necessary, other weights or buoyant materials are combined with the envelope 124 so that it remains in a substantially vertical position within the tank 110. In the vertical position, with the bottom of the envelope just contacting the bottom of the tank 110, the water detector 120 provides an indication of the depth of the water by virtue of the water absorbed by the material 129 causing the lower part of the device to expand.

As with the water-absorbing device 20 shown in FIG. 1, the purpose of the present invention is to assure that if the device is inserted through an opening in a tank subsequently it can be removed from the opening when the water absorbent material 129 expands. The weighted member 130 determines the minimum diameter opening through which the device can be inserted into a tank. The device is made so that when it expands, its maximum diameter transversely of its long direction does not exceed the maximum diameter of the weighted member or disc 130. Accordingly, if the device can be inserted into a tank, it can also be removed, and the problem experienced in the past, where the device becomes lodged within the tank, is avoided.

In FIG. 8 another embodiment of the invention is shown where a device 220 consists of a single pocket or compartment 226. Preferably, the peripheral outline of the pocket is rounded and it contains water absorbent material 229 and a flat circular disc 230. A grommet 232 is placed through the cover or enclosure 224 so that a line or cable can be secured to the device for dropping it into a tank or the like through a limited size opening. The cover or envelope 224 can be made of two similar sized pieces of a porous fabric stitched together in the manner shown in FIG. 8. The device can be used either to absorb or to detect the presence of water.

As with the other devices described above, the size of the disc 230 determines whether or not the device can be inserted into a tank. If the maximum dimension of the disc is greater than the diameter of the opening into the tank then it cannot be inserted. If it is the same or of a smaller diameter than the tank opening, then it can be inserted to determine the presence of water or to absorb water. When it is desired to remove the device, the maximum dimension of the disc determines the maximum size of the expanded envelope so that it is assured that it can be removed from the tank after it has been used and has absorbed water.

Accordingly, whichever device is used, by selecting the proper size of the envelope, the amount of the water absorbent material filled into each pocket or compartment of the envelope along with the maximum size or diameter of the weighted member or disc, it is possible to ensure that once the device is inserted through an opening into the tank, even though it expands when absorbing liquid water, it can always be removed through the same opening. Use of such a device prevents the difficulties experienced in the past where the device expanded to such a size that it could not be removed from the tank and, therefore, had to be broken or ruptured with the subsequent problems of collecting the material originally within the compartments in the device.

While specific embodiments of the invention have been shown and described in detail to illustrate the application of the inventive principles, it will be understood that the invention may be embodied otherwise without departing from such principles.

I claim:

1. A device for detecting the presence of or for absorbing water from the bottom of a closed tank or the like having a restricted opening through which the device is inserted into and removed from the tank comprising an envelope closed along the sides thereof and providing an interior space, said envelope formed of a porous cover material capable of transmitting liquid water into the interior space in said envelope, a filler material located within the interior space within said envelope forming a loose pulverized dry filling, for affording maximum absorbency said filler material is liquid water absorbent but does not absorb liquids which do not contain water and said filler material has the characteristic of expanding to many times its dry volume when it absorbs liquid water, said filler material after it absorbs liquid water can be returned to the unexpanded dry state by drying only, the liquid water cannot be squeezed out of said filler material, at least one weighted member is located within the interior space along with said filler material so that said weighted member causes said device to sink to the bottom of the tank into which it is inserted, said weighted member comprises a generally flat disc-like member having a circumferentially extending edge surface having a maximum diametrical dimension determining the minimum diameter tank opening through which said device can be inserted and said envelope being dimensioned and filled with a selected amount of said pulverized filler material so that when said filler material absorbs liquid water and expands, the maximum dimension of the expanded said envelope generally perpendicular to the direction of removal through the tank opening is not greater than the maximum diametrical dimension of the circumferentially extending edge surface of said weighted member whereby said device after absorbing water can be removed out of the opening through which it was inserted into the tank.

2. A device, as set forth in claim 1, wherein said weighted member has a circular circumferentially extending edge surface.

3. A device, as set forth in claim 1, wherein said weighted member has a polygonally shaped circumferentially extending edge surface with the circumferential edge thereof approximating a circular shape.

4. A device, as set forth in claim 1, including a line secured to one edge of said envelope and extending therefrom so that using said line the envelope can be placed into the tank and using said line said envelope can be removed from the tank.

5. A device, as set forth in claim 1, wherein said water absorbent material is a natural material and comprises sterculia lychnophora Hance powder.

6. A device, as set forth in claim 1, wherein said water absorbent material is a synthetic material.

7. A device, as set forth in claim 6, wherein said synthetic water absorbent material is in a finely divided form.

8. A device, as set forth in claim 6, wherein said synthetic water absorbent material is in the form of a plurality of chips.

9. A device, as set forth in claim 6, wherein said synthetic water-absorbent material is in the form of a sheet.

10. A device, as set forth in claim 1, wherein said envelope containing said weighted member and the loose dry filling of said water absorbent material has an elongated rectangular shape.

11. A device, as set forth in claim 10, wherein said envelope is divided into a number of compartments by separation lines extending transversely of the elongated direction of said envelope and forming individual compartments between said separation lines with each of said compartments containing one of said weighted members and said water absorbent material.

12. A device, as set forth in claim 1, wherein said envelope has a circularly shaped outer edge with the interior space therein having a circular shape with a diameter sufficient to contain said weighted member.

13. A device, as set forth in claim 1, wherein said envelope being formed of a porous woven fabric.

14. A device, as set forth in claim 13, wherein said envelope is a rectangularly shaped piece of woven fabric folded over upon itself along an elongated fold line with the open edges of the folded over piece of fabric being sewn together to close the interior space within said envelope.

15. A device for detecting the presence of or for absorbing water from the bottom of a closed tank or the like having an opening of a certain size through which the device is inserted into and removed from the tank, comprising a rectangularly shaped envelope elongated in one direction and closed along the sides thereof, a number of connecting lines extending transversely of the elongated direction of said envelope and dividing the interior space within said envelope into a number of separate compartments, said envelope formed of a porous material for admitting liquid water to the interior space in said envelope, a filler material located within each of the compartments within said envelope and comprising a loose pulverized dry filling, said filler material being liquid water absorbent but not oil absorbent and said material having the characteristic of expanding to many times its dry volume when it absorbs water, said filler material after it absorbs liquid water can be returned to the unexpanded dry state by drying only, the liquid water cannot be squeezed out of said filler material, at least one weighted member in the form of a flat circular disc located within each of the compartments within said envelope along with the loose dry filling therein so that said weighted member causes said device to sink to the bottom of the tank when it is inserted therein, said weighted member having a maximum diametrical dimension at the circumferential edge thereof so that said envelope cannot be placed through a tank opening having a smaller dimension than the maximum dimension of said weighted member, said envelope being dimensioned and filled with an amount of said water absorbing material so that when said material absorbs water and expands the maximum dimension of the expanded said envelope extending transversely of the elongated direction thereof is not greater than the maximum diametrical dimension at the circumferential edge of said weighted member whereby said device after absorbing water can be removed through the opening.

16. A device for detecting the presence of water or for absorbing water from the bottom of a closed tank or the like where the device is inserted through an opening of a certain size into the tank and can be removed from the opening when the device has completed its intended function, comprising an envelope closed along the sides thereof and providing an interior space, said envelope formed of a porous cover material capable of transmitting liquid water into the interior space in said envelope, a filler material located within the interior space within said envelope forming a pulverized loose dry filling, said filler material is liquid water absorbent but does not absorb liquids which do not contain water and said filler material has the characteristic of expanding to many times its dry volume when it absorbs liquid water, said filler material after it absorbs liquid water can be returned to the unexpanded dry state by drying only, the liquid water cannot be squeezed out of said filler material, at least one weighted member located within the interior space along with said filler material so that said weighted member causes said device to sink to the bottom of the tank into which it is inserted, said weighted member comprises a generally flat and circularly shaped disc-like member having a maximum dimension across the diameter of the circumferential edge thereof, said envelope is dimensioned and filled with an amount of said filler material so that when said filler material absorbs liquid water and expands the maximum dimension of the expanded said envelope extending transversely of the direction of removal of said envelope from the tank is not greater than the maximum dimension of the diameter of the circumferential edge of said weighted member so that as long as said device can be inserted through the opening of a tank it is assured that it has absorbed water that it will be able to be removed through the same opening.

* * * * *